(12) United States Patent
Huang et al.

(10) Patent No.: US 6,896,319 B1
(45) Date of Patent: May 24, 2005

(54) VEHICLE MODULAR BODY AND METHOD OF ASSEMBLY THEREOF

(75) Inventors: Yueh-Se (Joseph) Huang, Ann Arbor, MI (US); Phillip M. Turner, Grand Blanc, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/725,065

(22) Filed: Dec. 1, 2003

(51) Int. Cl.[7] .............................................. B60J 7/00
(52) U.S. Cl. ........................... 296/193.04; 296/193.08; 296/193.09; 296/193.06
(58) Field of Search ...................... 296/193.01, 193.03, 296/193.04, 26.08, 193.08, 293.09, 193.06

(56) References Cited

U.S. PATENT DOCUMENTS

| | | | |
|---|---|---|---|
| 1,854,714 A * | 4/1932 | Northup ................ 296/193.08 |
| 2,307,172 A * | 1/1943 | Vanhooser ................. 296/35.1 |
| 2,816,794 A * | 12/1957 | Temp ........................ 29/401.1 |
| 4,422,685 A | 12/1983 | Bonfilio et al. ........ 296/193.04 |
| 4,533,172 A | 8/1985 | Oliver ................... 296/203.01 |
| 4,676,545 A | 6/1987 | Bonfilio et al. ........ 296/193.04 |
| 4,842,326 A | 6/1989 | DiVito ................... 296/193.04 |
| 4,865,378 A | 9/1989 | Filtri et al. ............ 296/193.07 |
| 4,874,200 A | 10/1989 | Nasu et al. ............ 296/193.04 |
| 4,881,756 A | 11/1989 | Kumasaka et al. ......... 280/785 |
| 4,887,859 A * | 12/1989 | Aper ....................... 296/26.08 |
| 4,900,083 A | 2/1990 | Kumasaka et al. .... 296/193.04 |
| 4,968,087 A * | 11/1990 | Goria .................... 296/193.04 |
| 4,978,164 A | 12/1990 | Nakamura et al. ..... 296/193.04 |
| 5,090,105 A | 2/1992 | DeRees ........................ 29/469 |
| 5,338,080 A * | 8/1994 | Janotik et al. ................ 296/29 |
| 5,401,056 A | 3/1995 | Eastman ..................... 280/785 |
| 5,642,563 A | 7/1997 | Bonnett ........................ 29/771 |
| 5,833,269 A | 11/1998 | Gastesi ....................... 280/785 |
| 5,845,387 A | 12/1998 | Bonnett et al. ............ 29/527.1 |
| 6,003,935 A | 12/1999 | Kalazny ..................... 296/204 |
| 6,131,284 A | 10/2000 | Basler ....................... 29/897.2 |
| 6,276,477 B1 | 8/2001 | Ida ............................ 180/89.1 |
| 6,282,769 B1 | 9/2001 | Longo et al. ................. 29/417 |
| 6,390,537 B1 * | 5/2002 | DiGonis .................. 296/181.1 |
| 6,493,920 B1 | 12/2002 | Hill et al. ...................... 29/469 |
| 2002/0190516 A1 | 12/2002 | Henksmeier et al. ....... 280/785 |
| 2004/0012228 A1 * | 1/2004 | Durand .................. 296/193.03 |

* cited by examiner

*Primary Examiner*—Patricia L. Engle
(74) *Attorney, Agent, or Firm*—Kathryn A. Marra (57) ABSTRACT

A modular body for a vehicle includes a first module having a first B-pillar interface and a second module having a second B-pillar interface. The first and second modules are joined at the first and second B-pillar interfaces defining a B-pillar thereat.

19 Claims, 7 Drawing Sheets

VEHICLE MODULAR BODY AND METHOD OF ASSEMBLY THEREOF

BACKGROUND OF THE INVENTION

The present disclosure relates generally to a modular body for a vehicle, and particularly to a modular body for a passenger vehicle.

The framing of an automobile body prior to painting is referred to as body-in-white framing and includes the fixturing and joining of large body panels, components or subassemblies. An exemplary auto body frame includes an underbody with side panels welded thereto, and a top panel welded to the side panels. The combination of underbody, side panels, and top panel, defines an engine compartment, a passenger compartment, and a storage compartment. With the size of some vehicles being large, so too are the panels, which requires the use of large and multiple fixturing tools.

In an effort to assist with material handling and reducing tooling and fixturing costs, modular assemblies for the manufacturing of automobiles have been devised, which have included a separation between the passenger compartment and the engine compartment, and a separation between the passenger compartment and the storage compartment. However, such efforts may still result in the handling of large side panels. Accordingly, there is a need in the art for a vehicle modular body that overcomes these drawbacks.

SUMMARY OF THE INVENTION

A modular body for a vehicle includes a first module having a first B-pillar interface and a second module having a second B-pillar interface. The first and second modules are joined at the first and second B-pillar interfaces defining a B-pillar thereat.

A modular body for a vehicle includes a first module defining a first passenger compartment and having a first B-pillar interface, and a second module defining a second passenger compartment and having a second B-pillar interface. The first B-pillar interface is disposed proximate the second B-pillar interface defining a B-pillar thereat.

A method for assembling a vehicle body is disclosed. A first module having a first B-pillar interface is engaged with a second module having a second B-pillar interface such that the first and second B-pillar interfaces are disposed proximate each other. The first module defines a first passenger compartment and the second module defines a second passenger compartment. The first and second B-pillar interfaces are joined together defining a B-pillar thereat.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a modular body for a vehicle that is segmented at the B-pillar. As used herein, the term B-pillar refers to a structural element that defines a separation between a first passenger compartment and a second passenger compartment, the term A-pillar refers to a structural element that defines a separation between an engine compartment and the first passenger compartment, and the term C-pillar refers to a structural element that defines a separation between the second passenger compartment and a storage compartment. In an exemplary embodiment, the first passenger compartment provides an environment for a front seat driver and/or passenger and the second passenger compartment provides an environment for a back seat passenger. While the embodiment described herein depicts an automobile as an exemplary vehicle, it will be appreciated that the disclosed invention is also applicable to other vehicles, such as a limousine, a sport utility vehicle, and a truck, for example.

Figure 1:
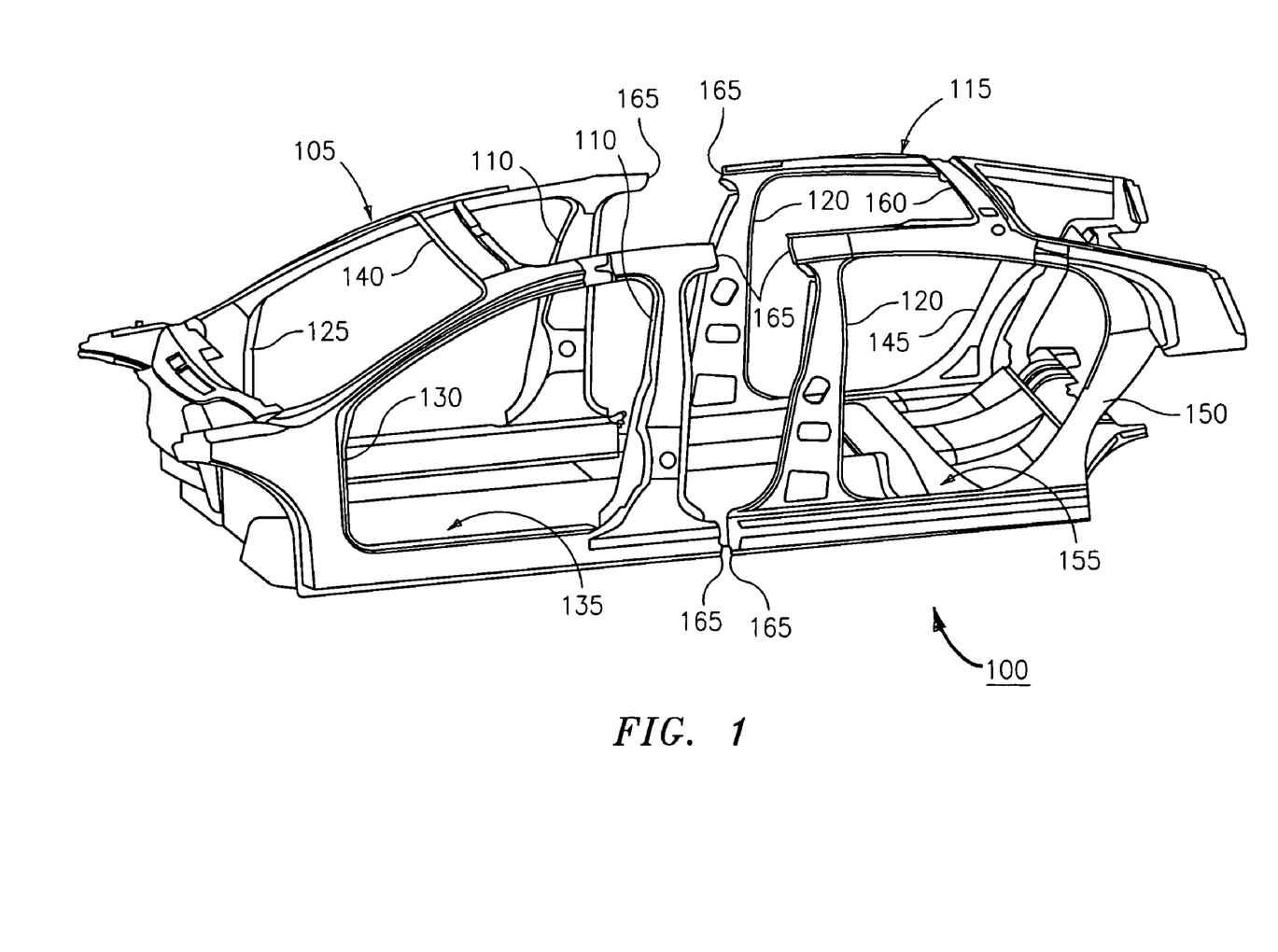
FIG. 1 depicts an exemplary embodiment of a modular body for a vehicle in accordance with an embodiment of the invention.

FIG. 1 is an exemplary embodiment of a modular body 100 for a vehicle having a first module 105 with a first B-pillar interface 110, and a second module 115 with a second B-pillar interface 120. First module 105, defining a first passenger compartment, includes two side portions 125, 130, an underbody portion 135, and optionally a top portion 140. Second module 115, defining a second passenger compartment, includes two side portions 145, 150, an underbody portion 155, and optionally a top portion 160. Top portions 140, 160 may be absent in a vehicle configured as a convertible. First and second modules 105, 115, fabricated and welded to form structural modules, are joined at B-pillar interfaces 110, 120 defining a B-pillar 200 thereat, best seen by referring to FIG. 2. In an embodiment, first B-pillar interface 110 is outboard of second B-pillar interface 120, however, in an alternative embodiment the opposite arrangement of inboard/outboard interfaces may be employed.

Figure 2:
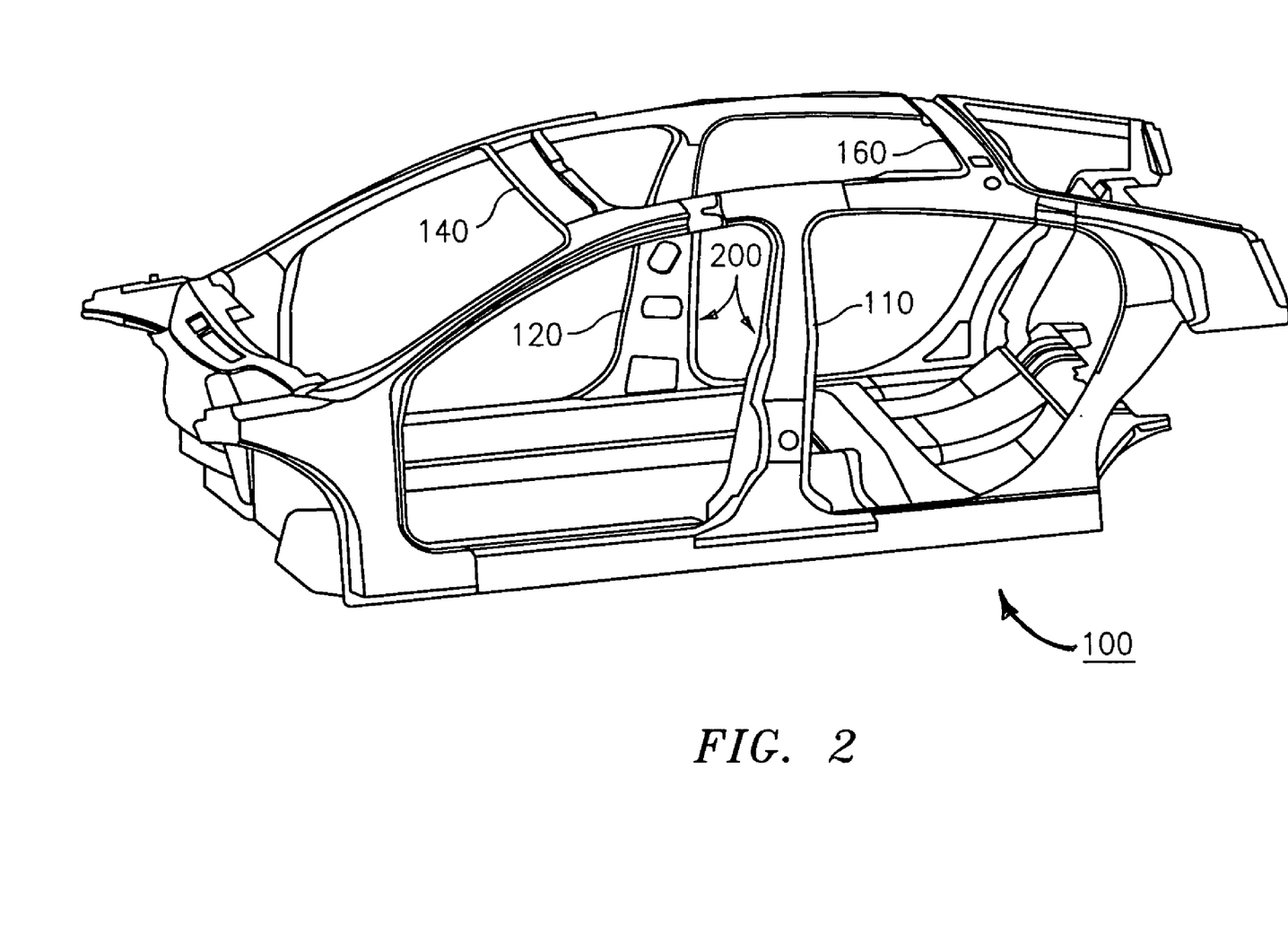
FIG. 2 depicts the modular body embodiment of FIG. 1 with the modular body components joined.

In an embodiment, first and second B-pillar interfaces 110, 120 are slidably engaged with each other via interlocking rails 165, which may include channels and tabs for example. Once slidably engaged, as depicted in FIG. 2, B-pillar interfaces 110, 120 may be joined together by mechanical, adhesive, adhesive-mechanical, metallurgical, or adhesive-metallurgical bonding. In an embodiment, B-pillar interfaces 110, 120 are welded together.

Figure 3:
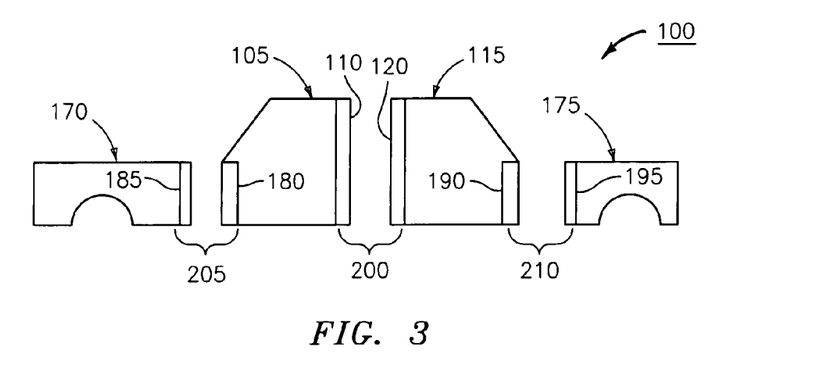
FIG. 3 depicts a side view of a block drawing representation of the modular body of FIGS. 1 and 2.

Referring to FIG. 3, a side view of a block drawing representation of the modular body 100 of FIGS. 1 and 2 is depicted, which in an embodiment may be representative of a four-door automobile. Here, modular body 100 includes first and second modules 105, 115 having first and second B-pillar interfaces 110, 120 similar to FIGS. 1 and 2, a third module 170 defining an engine compartment, and a fourth module 175 defining a storage compartment. Included in first module 105 is a first A-pillar interface 180, included in third module 170 is a second A-pillar interface 185, included in second module 115 is a first C-pillar interface 190, and included in fourth module 175 is a second C-pillar interface 195. In the assembled state, first and third modules 105, 170 are joined at A-pillar interfaces 180, 185 defining an A-pillar 205 thereat, and second and fourth modules 115, 175 are joined at C-pillar interfaces 190, 195 defining a C-pillar 210 thereat. Similar to B-pillar 200, A-pillar interfaces 180, 185 and C-pillar interfaces 190, 195 may be slidably engaged with each other and then welded together.

Figure 4:
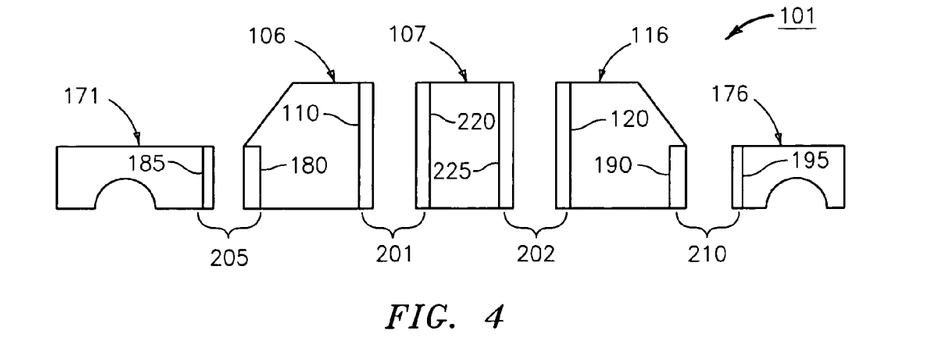
FIG. 4 depicts a side view of a block drawing representation of an alternative modular body in accordance with an embodiment of the invention.

Referring to FIG. 4, a side view of a block drawing representation of an alternative modular body 101 is depicted, which in an embodiment may be representative of a limousine-type automobile. Here, modular body 101 includes a first module 106 (similar to first module 105 of FIG. 3), a second module 107, a third module 116 (similar to second module 115 of FIG. 3), a fourth module 171 (similar to third module 170 of FIG. 3), and a fifth module 176 (similar to fourth module 175 of FIG. 3). First, second and third modules 106, 107, 116 define passenger compartments, with passenger compartments defined by modules 107, 116 optionally being configured as one large passenger compartment. First and fourth modules 106, 171 include A-pillar interfaces 180, 185; first and second modules 106, 107 include B-pillar interfaces 110, 220; second and third modules 107, 116 include B-pillar interfaces 225, 120; and, third and fifth modules 116, 176 include C-pillar interfaces 190, 195. In the assembled and joined state, A-pillar interfaces 180, 185 define an A-pillar 205 thereat, C-pillar interfaces 190, 195 define a C-pillar 210 thereat, B-pillar interfaces 110, 220 define a first B-pillar 201 thereat, and B-pillar interfaces 225, 120 define a second B-pillar 202 thereat. Since first and second B-pillars 201, 202 segment passenger compartments defined by first, second and third modules 106, 107, 116, they are referred to as B-pillars, as discussed previously.

In viewing FIGS. 3 and 4, it will be appreciated that the number of B-pillars 200, 201, 202, is not limited to one or two, but may be any number suitable for the purpose of providing a modular body for a vehicle with reduced module size.

Figure 5:
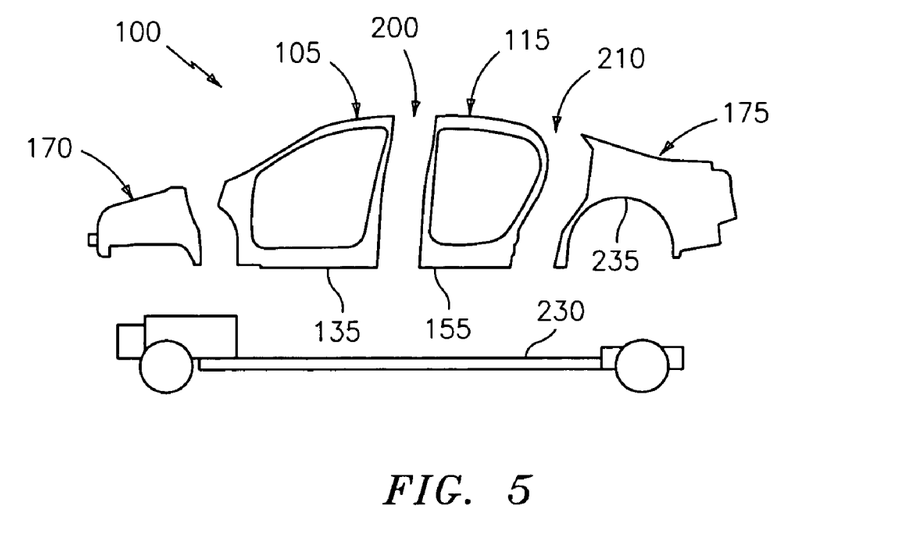
FIGS. 5–8 depict alternative modular body arrangements for a vehicle in accordance with an embodiment of the invention.

Referring to FIG. 5, a modular body 100 for a vehicle is depicted having a first module 105 defining a passenger compartment, a second module 115 defining another passenger compartment, and a fourth module 175 defining a storage compartment. In the assembled state, the underbody portions 135, 155, 235 of first, second and fourth modules 105, 115, 175, respectively become one underbody when welds are applied there between. In an embodiment, third module 170 defining an engine compartment becomes a portion of the finished modular body. In an alternative embodiment, third module 170 may be assembled to a chassis 230 along with assembly of other modules to the chassis. As used herein, the term "chassis" refers to that structure of the vehicle that includes the frame, powertrain and suspension components, for example, which is depicted generally by numeral 230.

Figure 6:
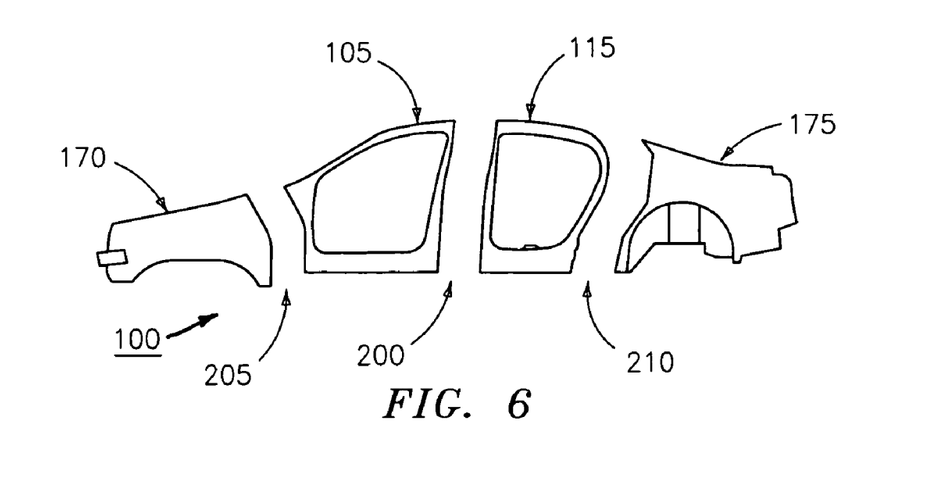
Figure 7:
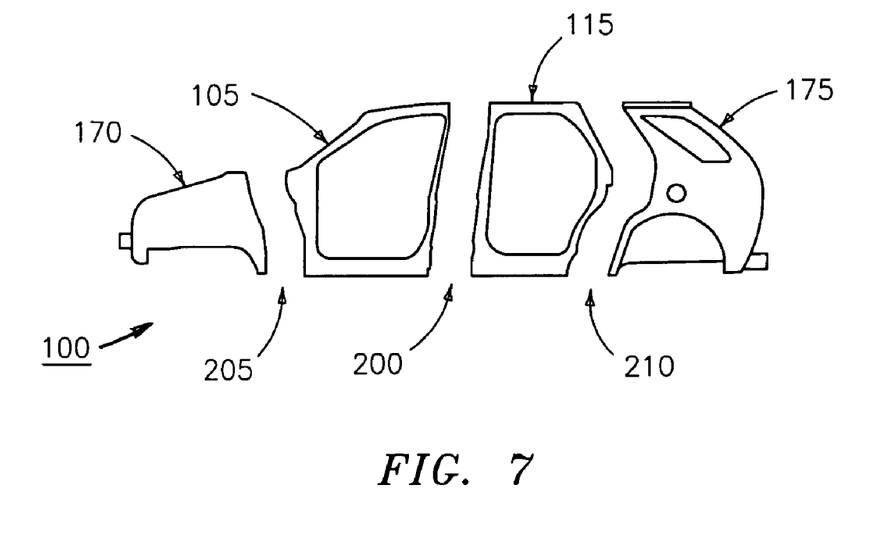
Figure 8:
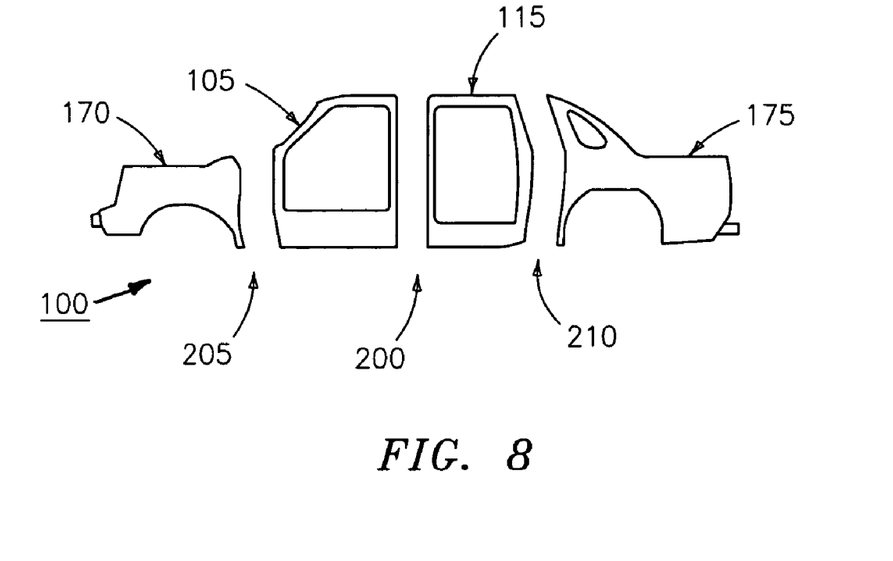

Alternative embodiments of modular body 100 are depicted in FIGS. 6–8. While FIGS. 5–8 depict A-pillar 205, B-pillar 200 and C-pillar 210 as segmented regions, it will be appreciated that interfaces for A-pillar 205, B-pillar 200 and C-pillar 210 may be applied in accordance with the earlier discussion relating to A-pillar interfaces 180, 185, B-pillar interfaces 110, 120, and C-pillar interfaces 190, 195. For example, second and fourth modules 115, 175 may be slidably engaged with each other at C-pillar 210 via C-pillar interfaces 190, 195, and then welded together.

FIGS. 6–8 are representative of alternative modular body arrangements 100, such as a sedan automobile depicted in FIG. 6, a sport utility vehicle depicted in FIG. 7, and a truck depicted in FIG. 8.

In an exemplary assembly process, first module 105 is slidably engaged with second module 115 at B-pillar 200, third module 170 is slidably engaged with first module at A-pillar, fourth module 175 is slidably engaged with second module 115 at C-pillar, and then the entire assembly is placed on chassis 230. In view of the earlier discussion relating to alternative modular body arrangements, it will be appreciated that variations on the assembly process may be employed. During or upon completion of the assembly of modules 105, 115, 170 and 175 onto chassis 230, attachment would be applied at strategic points for maintaining dimensional stability and for providing additional structural integrity.

While the respective mating parts of the pillar interfaces are disclosed as being slidably engaged with each other, it will be appreciated that the slidable engagement may be replaced with any suitable joining arrangement, such as an overlapping and welded interface arrangement, or a pipe-fitting arrangement, for example.

Figure 9:
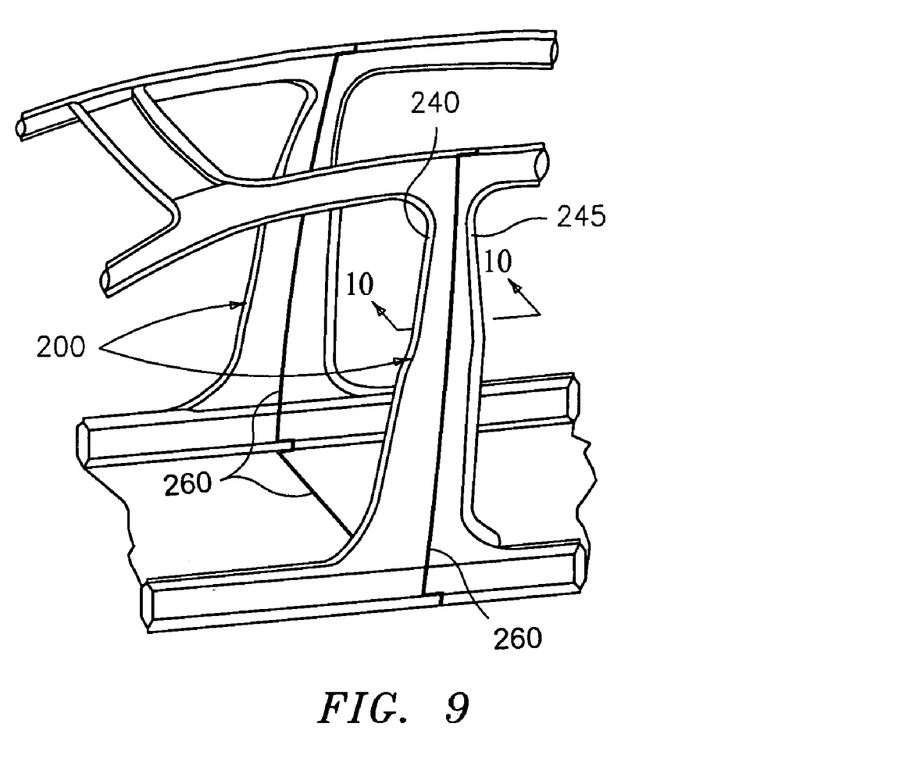
FIGS. 9–11 depict alternative arrangements for implementing an embodiment of the invention.
Figure 10:
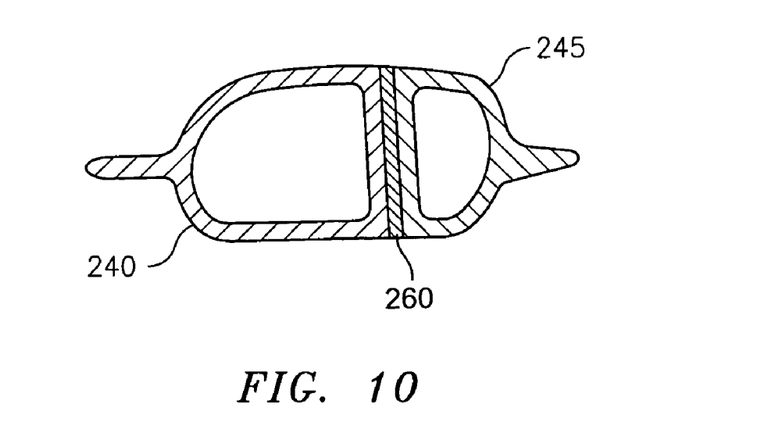
Figure 11:
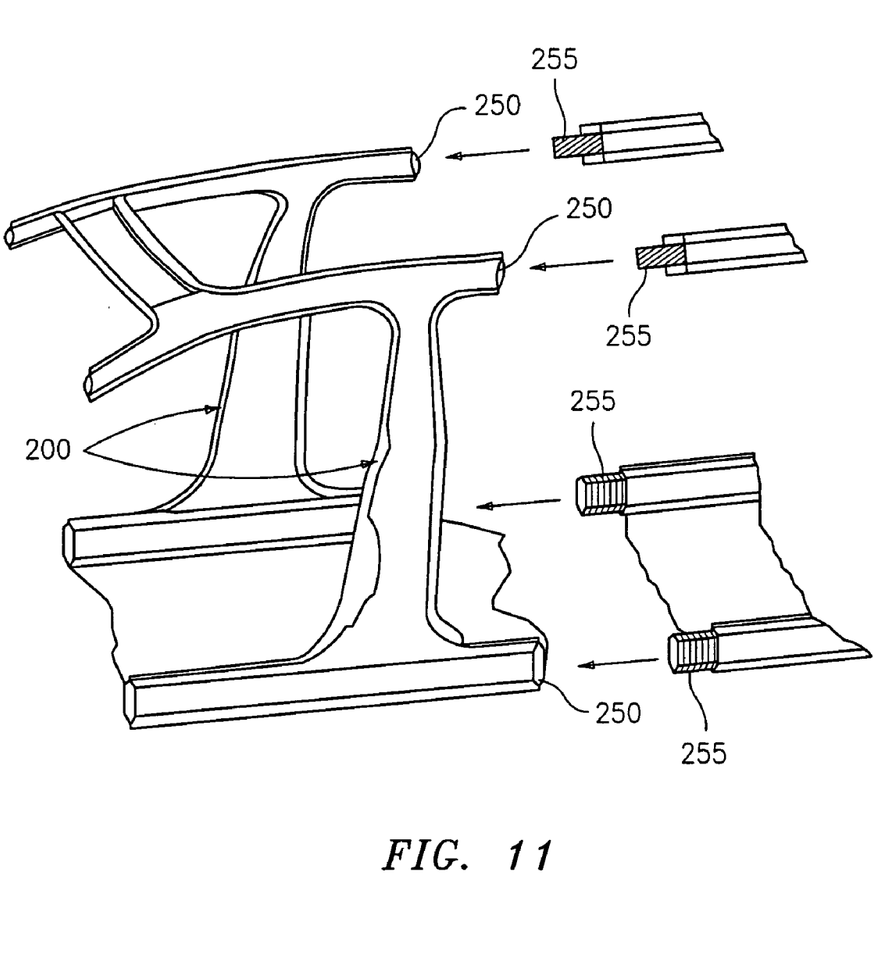

Referring now to FIGS. 9–11, alternative B-pillar structures are depicted, where FIG. 10 is a cross section view through the B-pillar 200 of FIG. 9. In FIGS. 9 and 10, B-pillar 200 includes a bonding area 260 formed by shaped channels 240, 245, and in FIG. 11, B-pillar 200 includes ports 250 for receiving projections 255. Ports 250 and projections 255 may be arranged as a tube-to-tube fit, a sheet-to-sheet fit, a tube-to-sheet fit, or any other arrangement suitable for the purpose of joining two B-pillar sections. Any of the bonding techniques discussed previously may be employed for securing the mating portions of B-pillar 200. As discussed earlier, the various modules (105, 115, 170 and 175 for example) include underbody, top, and side portions, 135, 140, 145 and 150, which in an embodiment are pre-assembled into modules at the same or a different assembly facility. By modularizing the vehicle body, less floor space may be needed for assembling each module, smaller crating may be needed for transporting each module, and a higher packing density may be achievable in transporting the body modules. Also, by utilizing modules during the framing stage (that is, during the final assembly of the body modules to each other and to the chassis), fewer movable parts may need to be held in place via clamps, thereby providing easier access for installing or mounting additional components, and improving the dimensional accuracy between mating modules. While an embodiment of the invention has been disclosed for a vehicle having an engine compartment at the front of the vehicle, it will be appreciated that the scope of the invention is not so limited, and that a vehicle having a rear-engine or a mid-engine arrangement also falls within the scope of the invention.

As disclosed, some embodiments of the invention may include some of the following advantages: reduced tolerance stack up arising from part fabrication or assembled parts; improved dimensional accuracy at the subassembly (modules) and final assembly (framing) levels; improved dimensional accuracy at the full vehicle level; less required floor space at the subassembly level; higher packing density during transportation of the body modules; versatility in using standard body modules in multiple vehicle designs; smaller tooling and fixturing during the assembly and framing processes; lower cost tooling at the framing station; reduced number of different parts required to build the body-in-white; and, ability to build the body-in-white for a vehicle having versatile style and function.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A modular body for a vehicle having a chassis separate from the modular body, the modular body comprising:
a first module having a first B-pillar interface, the first module having an underbody portion and being configured to assemble on the chassis; and
a second module having a second B-pillar interface, the second module having an underbody portion and being configured to assemble on the chassis;
wherein the first and second modules are joined at the first and second B-pillar interfaces defining a B-pillar thereat, the B-pillar defining a separation between passenger compartments.

2. The modular body of claim 1, wherein:
the first module includes two side portions;
the second module includes two side portions; and
the underbody portions of the first and second modules make up an underbody portion of the vehicle.

3. The modular body of claim 2, wherein:
the first module includes a top portion; and
the second module includes a top portion.

4. The modular body of claim 1, wherein the second module further includes a third B-pillar interface, and further comprising:
a third module having a fourth B-pillar interface, the third module being configured to assemble on the chassis;
wherein the second and third modules are joined at the third and fourth B-pillar interfaces defining a second B-pillar thereat, the second B-pillar defining a separation between passenger compartments.

5. The modular body of claim 1, wherein the first B-pillar interface is outboard of the second B-pillar interface.

6. The modular body of claim 1, wherein the first and second B-pillar interfaces are slidably engaged with each other.

7. The modular body of claim 6, further comprising a weld at the B-pillar interfaces.

8. A modular body for a vehicle having a chassis separate from the modular body, the modular body comprising:
a first module defining a first passenger compartment and having a first B-pillar interface, the first module having an underbody portion and being configured to assemble on the chassis; and
a second module defining a second passenger compartment and having a second B-pillar interface, the second module having an underbody portion being configured to assemble on the chassis;
wherein the first B-pillar interface is disposed proximate the second B-pillar interface defining a B-pillar thereat, the B-pillar defining a separation between the first and second passenger compartments.

9. The modular body of claim 8, further comprising:
a complete underbody made up from the underbody portion of the first module and the underbody portion of the second module.

10. The modular body of claim 8, wherein the first module has a first A-pillar interface, and further comprising:
a third module defining an engine compartment and having a second A-pillar interface, the third module being configured to assemble on the chassis;
wherein the first A-pillar interface is disposed proximate the second A-pillar interface defining an A-pillar thereat.

11. The modular body of claim 10, wherein the second module has a first C-pillar interface, and further comprising:
a fourth module defining a storage compartment and having a second C-pillar interface, the fourth module being configured to assemble on the chassis;
wherein the first C-pillar interface is disposed proximate the second C-pillar interface defining a C-pillar thereat.

12. The modular body of claim 11, further comprising a weld at the A-pillar, the B-pillar, the C-pillar, or any combination thereof comprising at least one of the foregoing pillars.

13. A method for assembling a vehicle body for a vehicle having a chassis separate from the body, the method comprising:
engaging a first module having a first B-pillar interface with a second module having a second B-pillar interface such that the first and second B-pillar interfaces are disposed proximate each other, the first module having an underbody portion and defining a first passenger compartment, the second module having an underbody portion and defining a second passenger compartment; and
joining together the first and second B-pillar interfaces defining a B-pillar thereat.

14. The method of claim 13, wherein the joining comprises at least one of mechanical, adhesive, adhesive-mechanical, metallurgical, and adhesive-metallurgical bonding.

15. The method of claim 13, wherein the first module includes a first A-pillar interface, and further comprising:
engaging a third module having a second A-pillar interface with the first module such that the first and second A-pillar interfaces are disposed proximate each other, the third module defining an engine compartment; and
joining together the first and second A-pillar interfaces defining an A-pillar thereat.

16. The method of claim 15, wherein the second module includes a first C-pillar interface, and further comprising:
engaging a fourth module having a second C-pillar interface with the second module such that the first and second C-pillar interfaces are disposed proximate each other, the fourth module defining a storage compartment; and
joining together the first and second C-pillar interfaces defining a C-pillar thereat.

17. The method of claim 16, wherein the joining together the A-pillar and the C-pillar interfaces comprises at least one of mechanical, adhesive, adhesive-mechanical, metallurgical, and adhesive-metallurgical bonding.

18. The method of claim 13, wherein the joining comprises slidably engaging the first and second B-pillar interfaces with each other.

19. A vehicle, comprising:
a chassis; and
a modular body structurally distinct from the chassis, the modular body being disposed on the chassis;
wherein the modular body comprises:
a first module having a first B-pillar interface, the first module having two side portions and an underbody portion; and
a second module having a second B-pillar interface, the second module having two side portions and an underbody portion;
wherein the first and second modules are joined at the first and second B-pillar interfaces defining a B-pillar thereat, the B-pillar defining a separation between passenger compartments;
wherein the underbody portions of the first and second modules make up an underbody portion of the vehicle that is disposed on the chassis.

* * * * *